United States Patent
Keydar et al.

(10) Patent No.: US 7,782,485 B2
(45) Date of Patent: Aug. 24, 2010

(54) LINEARIZATION AND CHARACTERIZATION PROCESS OF AN IMAGE PRODUCING DEVICE

(75) Inventors: Moshe Keydar, Holon (IL); Martin Beyer, Bergkamen (DE); Francis Lamy, Wollerau (CH)

(73) Assignee: X-Rite Europe GmbH, Regensdorf (CH)

( * ) Notice: Subject to any disclaimer, the term of this patent is extended or adjusted under 35 U.S.C. 154(b) by 1205 days.

(21) Appl. No.: 11/368,379

(22) Filed: Mar. 7, 2006

(65) Prior Publication Data

US 2007/0070367 A1    Mar. 29, 2007

(30) Foreign Application Priority Data

Mar. 10, 2005  (EP)  .................................. 05005234

(51) Int. Cl.
*H04N 1/60* (2006.01)
*H04N 1/46* (2006.01)

(52) U.S. Cl. ........................ 358/1.9; 358/504; 358/518; 358/535

(58) Field of Classification Search ................. 358/1.9, 358/3.23, 504, 536, 534, 533, 518, 519, 521, 358/522, 538, 523, 524, 505, 535, 2.1, 2.99, 358/3.01, 3.02, 3.03, 3.04, 3.05, 3.06, 3.07, 358/3.08, 3.09, 3.1, 3.11, 3.12, 3.13, 3.14, 358/3.21, 501, 520, 530, 515, 516; 382/162, 382/167, 168, 169, 170, 163, 164, 165, 166; 347/24, 115, 172, 183, 184, 188, 232; 399/39, 399/184, 181, 182, 183, 298, 321
See application file for complete search history.

(56) References Cited

U.S. PATENT DOCUMENTS

| 5,416,613 | A | 5/1995 | Rolleston et al. |
| 5,649,072 | A | 7/1997 | Balasubramanian et al. |
| 6,381,037 | B1 * | 4/2002 | Balasubramanian et al. .......................... 358/3.23 |
| 6,441,923 | B1 | 8/2002 | Balasubramanian et al. |
| 6,580,524 | B1 * | 6/2003 | Weichmann et al. ......... 358/1.9 |
| 2002/0149785 | A1 * | 10/2002 | Chu et al. .................... 358/1.9 |

OTHER PUBLICATIONS

Vrhel M.J. et al., "Color printer characterization in MATLAB", Proceedings 2002 International Conference on Image Processing, IEEE, vol. 2 of 3, Sep. 22, 2002, pp. 457-460.

(Continued)

*Primary Examiner*—Dov Popovici
(74) *Attorney, Agent, or Firm*—Buchanan Ingersoll & Rooney PC

(57) ABSTRACT

Exemplary methods are directed to the linearization and characterization of an image producing device. In the method, a color test chart of the device is reproduced and measured based on a small number of color measurement fields with defined device color values. Associated color values are determined for each color measurement field and used to calculate linearization curves for the device. Additionally, by analysis of the device color values, the measured color values, and device behavior, an expanded color test chart with expanded device color values and associated expanded color values is calculated. The number of color measurement fields in the expanded color test chart is larger than the number of color measurement fields in the original color test chart. An ICC profile for the device is calculated from the expanded device color values and the expanded color values.

3 Claims, 1 Drawing Sheet

OTHER PUBLICATIONS

McCamy C.S. et al., "A Color-Rendition Chart", Journal of Applied Photographic Engineering, Society of Photographic Scientists and Engineers, Jun. 21, 1976, pp. 1-5.

Hardeberg J.Y. et al., "Color Management for Color Facsimile", Proceedings of the Color Imagining Conference: Color Science, Systems and Applications, 1996, pp. 108-113.

* cited by examiner

LINEARIZATION AND CHARACTERIZATION PROCESS OF AN IMAGE PRODUCING DEVICE

BACKGROUND

The invention relates to a process for the linearization and characterization of an image producing RGB or CMYK device according to the preamble of the independent claim.

The invention relates to the field of graphic processing and especially to the image producing devices used in its workflows, especially printers.

The typical graphic processing workflow includes the use of different image producing devices and offers the user the possibility to produce, look at, correct and output, especially print, images. The workflow normally extends from an image capturing step with input devices such as digital cameras and scanners to an observation step with display devices such as, for example a monitor, to an output step with output devices such as, for example, a printer. The user thereby aims in the output step for images which either come as close as possible to the underlying original or which are (according to individual conceptions) perceived as "nice" or "pleasing".

Because of the technological differences between the image producing devices (for example CCD, Filter, Inkjet, others), the need exists to first adjust the devices involved to a common colour description language. One of the most important points is thereby the linearization and characterization of each image producing device involved.

The linearization is most of the time carried out by the device manufacturer, requires special knowledge and requires a lot of time. The ICC (International Colour Committee) has defined what is to be understood under characterization: an ICC colour profile is assigned to each image producing device which describes the colour capabilities/limitations of the device.

The generation of an ICC profile for an image producing device is a relatively lengthy process which includes amongst other things the reproduction (for example printing) of a colour test chart with a respective device as well as the colorimetric evaluation of the many hundred individual test fields on the reproduced colour test chart. Standard colour test charts set by the ICC are often used, but special colour test charts of the manufacturers of profile generation software are also used. Common colour test charts are, for example, the IT8.73 (928 measurement fields) and the ECI2002 (1440 measurement fields). The working with such large colour test charts is very time consuming and costly for the normal (for example private) user.

SUMMARY

This problem is now to be addressed by the present invention and in particular a faster and less involved possibility for the linearization and characterization of any image producing device is to be provided, especially of any printer. In particular, the process in accordance with the invention is to provide the possibility to operate with significantly smaller colour test charts, which means those including significantly fewer measurement fields, without a loss in quality. Typically 45 colour measurement fields are to be sufficient for RGB devices (printer) and about 34 for CMYK devices (printer).

It is a further object of the invention to provide methods for the "intelligent" analysis of the performance of a printer taking into consideration the print head, ink and printing medium (paper) on the basis of the mentioned faster linearization and characterization.

BRIEF DESCRIPTION OF THE DRAWINGS

The invention is further described in the following with reference to the drawing and, for example, in connection with a printer. The sole FIGURE shows a flow diagram of the most important steps of the process in accordance with the invention. As symbolized by block 1 in the FIGURE, one starts with a printer set up according to standard (set up with default settings).

DETAILED DESCRIPTION

Figure 1:
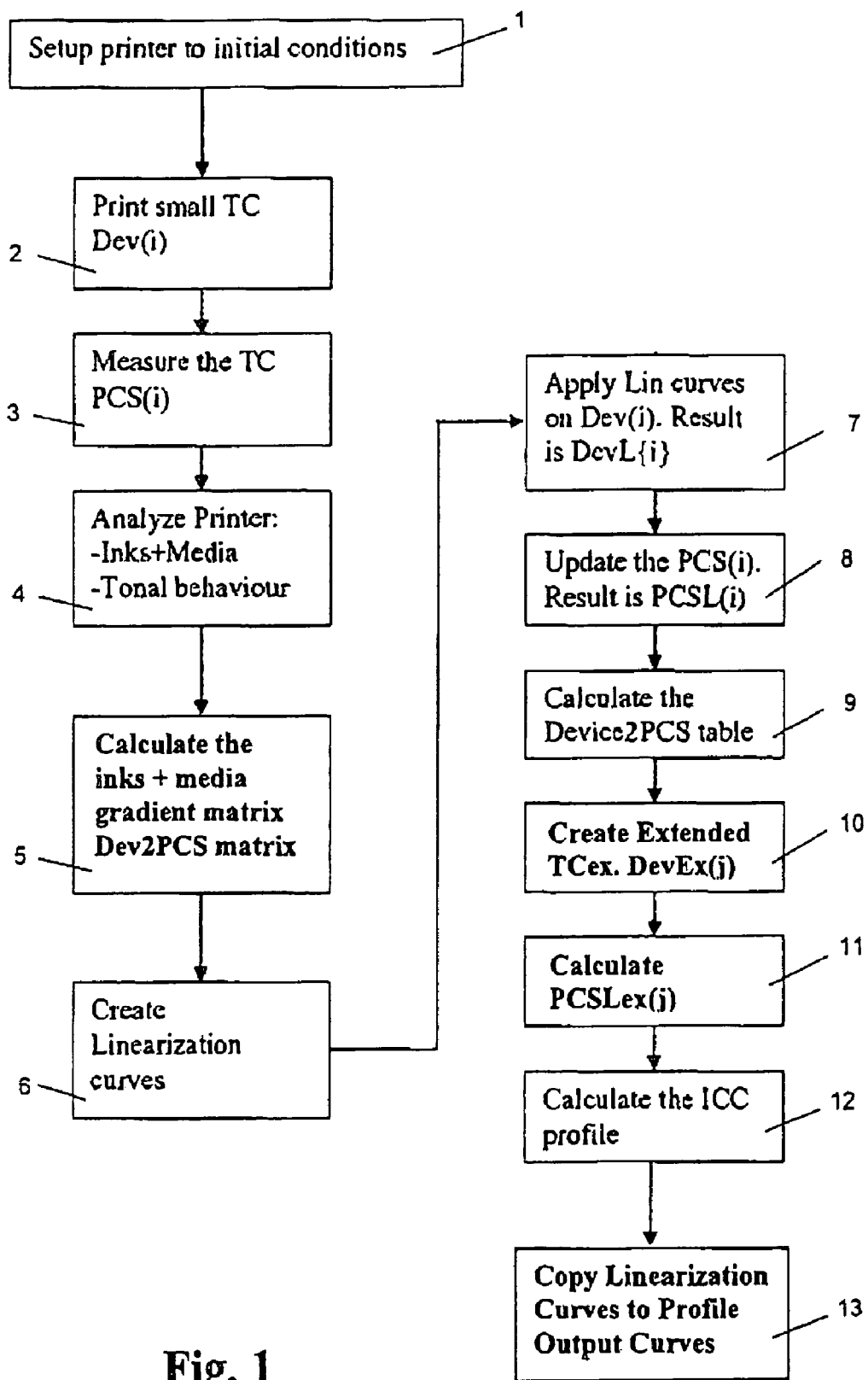

For the process in accordance with the invention, a predefined colour test chart TC is used, in the following also referred to as test chart, which has 45 colour measurement fields for RGB printers or 34 colour measurement fields for CMYK printers. The test chart is defined by the device colour values Dev(1) for each, typically square, colour measurement field, which are in the following also referred to as colour patches. The index i thereby stands for respectively one of the colour measurement fields and goes from one up to the number of colour measurement fields in the test chart, which means 1 . . . i . . . numofTCpatches, whereby numofTCpatches is, for example, 45 for RGB devices and, for example, 34 for CMYK devices. The colour measurement fields represent the main colours (RGB or CMYK) in a correspondingly gradiated form (0, 25, 50, 75, 100%) as well as different gray shades along the central axis of the colour space.

The colour test chart is now printed in a first process step (block 2) with the use of the device colour values Dev(i) with the printer adjusted according to standard.

In the next step, the printed colour test chart is scanned according to colour (block 3) by way of a spectrophotometer or colour measurement device. The measurement result is thereby for each colour measurement field a set of spectral values (for example 38 spectral energy values over the visible spectrum of 380-760 nm) or a set of L,a,b values. The measured spectral values or colour values for each colour measurement field i are in the following referred to as PCS(i), whereby i again is 1 . . . numofTCpatches. Each set i of the device colour values Dev(1) thereby corresponds to a said i of measured spectral or colour values PCS(i), which quantifies the colour of the respectively printed colour measurement field i.

In the following, "Dev" stands for "device" and "PCS" stands for "output colour space" or "profile connection space".

The whole of the device colour values Dev(1) and the measured colour values PCS(1) forms a colour databank which describes the image production behaviour of the device, which databank is in the following two process steps (blocks 4 and 5) analyzed and interpreted for the generation of different information.

A first information relates to the status of the print colours used, which means an indication whether the print colours lie within the defined specification. One considers therefore, the measured colour values or the hue, luminance and saturation values calculated therefrom of the full tone fields of the individual printing colours in the colour test chart TC. When these values fall outside the preset specifications, the process is terminated or a corresponding notification is output to the user.

A second information relates to the linearization state of the device, especially printer, which means information on whether and to which degree the relations between the device colour values and the measured colour values for the individual printing colours RGB or CMYK are linear. One can herefor also use the device colour values and the associated measured colour values from graduated single-colour colour measurement fields.

A third information relates to the behaviour of the device, especially the printer, upon gradual changes in the printing colours. This behaviour is expressed by a gradient matrix Dev2PCS, which describes the differential (gradual) relationship between the device colour values Dev(1) and the measured colour values PCS(i). The gradient matrix is thereby preferably determined for the center of the colour space and from the device colour values Dev(1) and the associated colour values PCS(1) of colour measurement fields of the colour test chart TC lying in the close vicinity of the colour space center.

In the next step (block 6) linearization curves LC are calculated for the printing colours used in the printer. These linearization curves LC describe (in table form) correction values for the device colour values Dev(i) for each printing colour, which leads to it that the colour values PCS(i) behave linear relative to the device colour values Dev(i). (In an ideally linear printer, these correction values would of course all be zero.) The mentioned colour databank is also used for the calculation of the linearization curves LC. One practically proceeds thereby in such a way that the luminance values (L) of the correspondingly graduated single-colour colour measurement fields are analyzed for each printing colour. By way of a polynomial spline function of the third order and a subsequent discretization at, for example, 100 supporting locations, the linearization curves LC are then calculated from the device colour values Dev(1) and from the L-values of the associated colour values PCS(i) and stored in table format.

In the following step (block 7), the linearization curves LC are applied to the device colour values Dev(i) which means the device colour values Dev(i) are corrected by way of the linearization curves LC. The corrected device colour values are in the following referred to as linearized device colour values DevL(i), the whole linearized device colour values DevL(i) represent a linearized colour test chart TCL.

In the next step (block 8) linearized colour values PCSL(i) are calculated. This calculation corresponds to a mathematical reproduction (model) of the real print of the linearized colour test chart TCL, whereby instead of the original device colour values Dev(i) the linearized device colour values DevL(i) are used as colour control values for the printer and the linearized colour values PCSL(i) to be expected in the print are pre-calculated. This pre-calculation can be carried out by way of a mathematical model which describes the image production behaviour of the printer. The already mentioned gradient matrix Dev2PCS is thereby an essential component of a suitable model. Furthermore, print colour formulating methods can also be included.

From the then present linearized device colour values DevL(i) and the linearized colour values PCSL(i) one now calculates in the following step (block 9) by way of interpolation and print colour formulation and with the help of the gradient matrix Dev2PCS a conversion table Device2PCS which connects the (linearized) device colour space Dev with the output colour space PCS, whereby an output colour value set Lab corresponds to each device colour value set RGB or CMYK and the conversion table preferably covers the whole printable colour space.

In the next step (block 10) an expanded colour test chart TCex is calculated by interpretation on the basis of the conversion table Device2PCS, which expanded colour test chart relative to the original number has a significantly larger number of colour measurement fields. The device colour values of this expanded colour test chart TCex are referred to as DevEx (j) whereby j is 1 to NumOfExtendedPatches and NumOfExtendedPatches is the overall number of colour measurement fields to be provided (original and expanded).

In the following step (block 11) one calculates also on the basis of the conversion table Dev2PCS expanded colour values PCSLex(j) for the expanded device colour values DevEx (j), possibly by interpolation. They correspond to the colour measurement values to be expected when the expanded colour test chart TCex were printed.

An ICC device profile P is then calculated in the following step (block 12) from the expanded device colour values DevEx(j) and the associated expanded colour values PCSEx (j) in a generally known manner and by way of a commercially available profile generation software.

In the last step (block 13) the linearization curves LC are in a known manner integrated into the device profile, which means the linearization curves LC are according to the standards of the ICC appended to the output curves of the so called B2A tables of the profile P.

The invention claimed is:

1. A process for linearization and characterization of an image producing device, wherein a colour test chart is reproduced which consists of a number of colour measurement fields with defined device colour values, the reproduced colour test chart is measured to determine colour values associated with each colour measurement field, wherein from the device colour values and the determined colour values a profile is calculated for the image producing device, wherein the reproduced colour test chart (TC) has a relatively low number of colour measurement fields and is reproduced and measured to obtain measured colour values, wherein based on the device colour values (Dev(i)) and the measured colour values (PCS(i)) of the reproduced colour test chart (TC), linearization curves (LC) are calculated for the image producing device, wherein based on the linearization curves (LC), an expanded colour test chart (TCex) with expanded device colour values (DevEx(j)) and associated expanded colour values PCSLex(j), is calculated based on the device colour values (Dev(i)) and the measured colour values (PCS(i)) of the reproduced colour test chart (TC), wherein from the device colour values (Dev(i)) and the measured colour values (PCS(i)) a gradient matrix (Dev2PCS) is calculated, the gradient matrix (Dev2PCS) describes the differential relationship between the device colour values and the measured colour values in a vicinity of a center of a colour space of the image producing device and is used to model the image producing device and calculate a conversion table, wherein the number of the colour measurement fields in the expanded colour test chart (TCex) is significantly larger than the number of the colour measurement fields in the reproduced colour test chart (TC) and wherein the profile for the image producing device is calculated from the expanded device colour values (DevEx(j)) and the expanded colour values (PCSLex (j)).

2. The process according to claim 1, wherein based on the device colour values (Dev(i)) and the measured colour values (PCS(i)) of the reproduced colour test chart (TC), a linearized test chart with linearized device colour values (DevL(i)) is calculated, and by modeling of the image producing device, corresponding linearized colour values PCSL(i) are calculated, wherein from the linearized device colour values (DevL(i)), the linearized colour values (PCSL(i)), and the gradient matrix, the conversion table (Device 2PCS) is calculated which represents a relationship between the linearized device colour values (DevL(i)) and the linearized colour values (PCSL(i)), and wherein the expanded colour test chart (TCex) is calculated by way of the conversion table (Device2PCS) with the expanded device colour values (DevEx(j)) and the associated expanded colour values (PCSLex(j)).

3. The process according to claim 1, wherein the linearization curves (LC) are integrated into output curves of the profile (P).

* * * * *